United States Patent [19]
Pletcher et al.

[11] Patent Number: 5,694,606
[45] Date of Patent: *Dec. 2, 1997

[54] MECHANISM FOR USING COMMON CODE TO HANDLE HARDWARE INTERRUPTS IN MULTIPLE PROCESSOR MODES

[75] Inventors: Richard A. Pletcher, Redmond; Ralph A. Lipe, Kirkland, both of Wash.

[73] Assignee: Microsoft Corporation, Redmond, Wash.

[*] Notice: The term of this patent shall not extend beyond the expiration date of Pat. No. 5,596,755.

[21] Appl. No.: 690,800

[22] Filed: Aug. 1, 1996

Related U.S. Application Data

[63] Continuation of Ser. No. 436,085, May 8, 1995, Pat. No. 5,596,755, which is a continuation of Ser. No. 971,069, Nov. 3, 1992, abandoned.

[51] Int. Cl.⁶ .................................................. G06F 13/00
[52] U.S. Cl. .................................... 395/734; 395/653
[58] Field of Search ......................... 395/733, 734, 395/700, 416, 550, 406, 653

[56] References Cited

U.S. PATENT DOCUMENTS

| | | | |
|---|---|---|---|
| 4,779,187 | 10/1988 | Letwin | 364/200 |
| 4,787,031 | 11/1988 | Karger et al. | 364/200 |
| 4,928,237 | 5/1990 | Bealkowski et al. | 364/200 |
| 4,930,068 | 5/1990 | Katayose et al. | 364/200 |
| 5,027,273 | 6/1991 | Letwin | 364/200 |
| 5,067,077 | 11/1991 | Wakimoto et al. | 395/400 |
| 5,109,329 | 4/1992 | Strelioff | 395/725 |
| 5,123,098 | 6/1992 | Gunning et al. | 395/400 |
| 5,125,087 | 6/1992 | Randell | 395/425 |
| 5,155,853 | 10/1992 | Mitsuhira et al. | 395/725 |
| 5,159,688 | 10/1992 | Matsushima et al. | 395/725 |
| 5,193,161 | 3/1993 | Bealkowski et al. | 395/400 |
| 5,237,669 | 8/1993 | Spear et al. | 395/400 |
| 5,255,379 | 10/1993 | Melo | 395/400 |
| 5,274,776 | 12/1993 | Senta | 385/375 |
| 5,274,831 | 12/1993 | Katsuta | 395/800 |
| 5,303,378 | 4/1994 | Cohen | 395/700 |
| 5,325,536 | 6/1994 | Chang et al. | 395/725 |

*Primary Examiner*—Ayaz R. Sheikh
*Attorney, Agent, or Firm*—Seed and Berry LLP

[57] ABSTRACT

An interrupt handler may be run in multiple processor modes on a data processing system having a processor for executing instructions and a memory for storing information. The sharing of interrupt handler code across multiple processor modes minimizes the switching between processor modes during the handling of interrupts. The mode in which the interrupt handler executes is dictated by the current processor mode. The indicator of the current processor mode directs the interrupt handler to use information that is appropriate for the current processor mode.

18 Claims, 11 Drawing Sheets

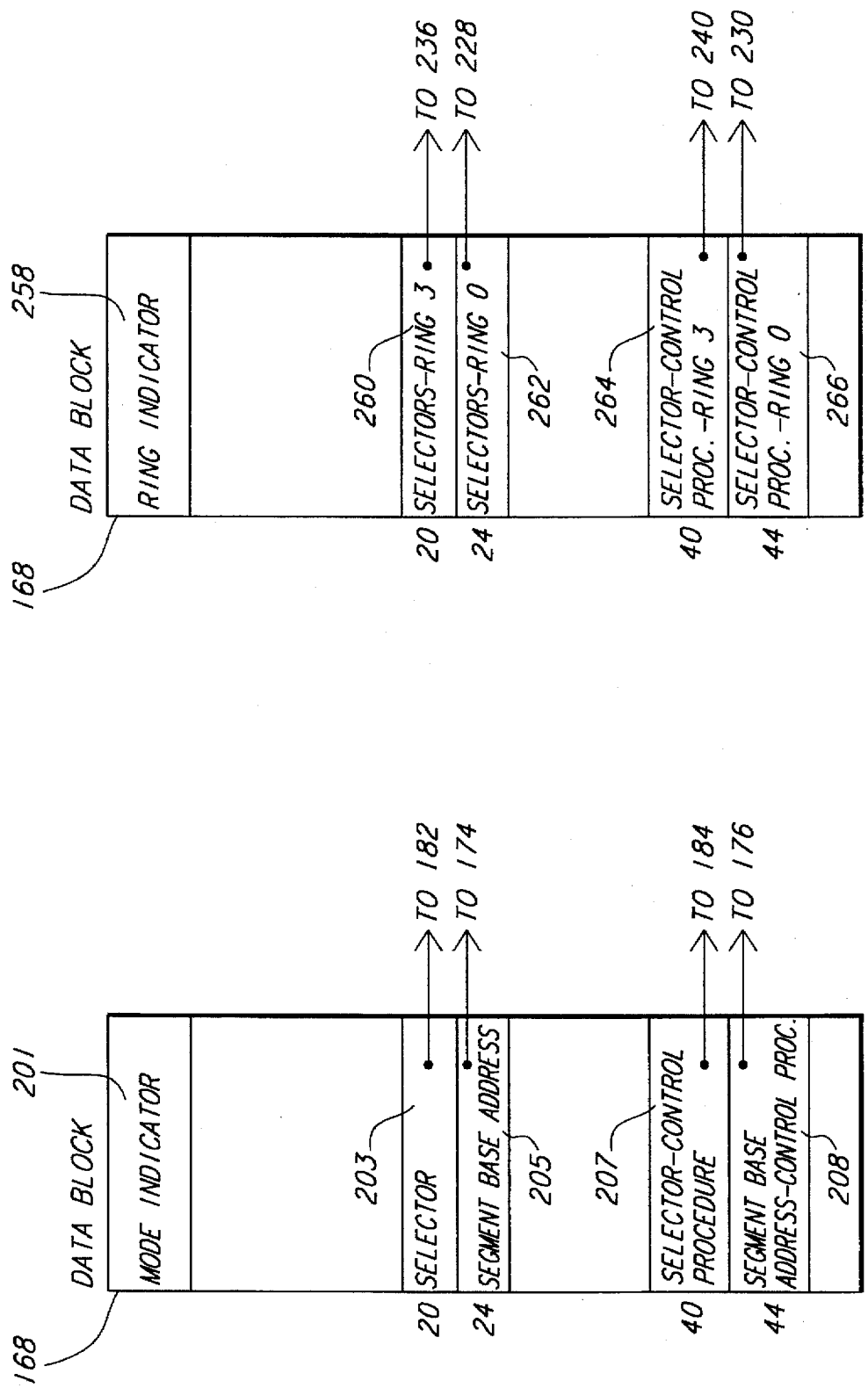

MECHANISM FOR USING COMMON CODE TO HANDLE HARDWARE INTERRUPTS IN MULTIPLE PROCESSOR MODES

CROSS-REFERENCE TO RELATED APPLICATION

This application is a continuation of U.S. patent application Ser. No. 08/436,085, filed May 8, 1995 U.S. Pat. No. 5,596,755, which is a File Wrapper Continuation of application Ser. No. 07/971,069 filed Nov. 3, 1992, which is now abandoned.

TECHNICAL FIELD

The present invention relates generally to data processing systems and, more particularly, to using common code to handle hardware interrupts in multiple processor modes.

BACKGROUND OF THE INVENTION

Many modern microprocessors are part of an evolving product line of microprocessors provided by their respective manufacturers. The 80386 microprocessor, sold by Intel Corporation of Cupertino, Calif., is an example of such a microprocessor. The 80386 microprocessor evolved from the 80286 microprocessor, which, in turn, evolved from the 8086 microprocessor. The later developed microprocessors of this microprocessor family have been designed to be compatible with their earlier developed counterparts. Hence, the 80386 microprocessor can run programs that are written for the 8086 microprocessor or the 80286 microprocessor (i.e., the family exhibits upward compatibility).

The 8086 microprocessor is designed to run in a single mode of operation, known as "real mode". FIG. 1 depicts the addressing scheme that is employed by the 8086 microprocessor in real mode. In this addressing scheme, a 16-bit real address 10 is used to specify an entry 20 in the physical memory 16. The real address 10 contains a 12-bit segment base address 12 and a 4-bit offset 14. The physical memory 16 is divided into segments containing contiguous blocks of memory. The segment base address 12 specifies the beginning of a segment 18. The offset 14 specifies an offset relative to the segment base address.

As is apparent from the above discussion, the 8086 microprocessor employs a addressing scheme wherein there is no virtualization of the address space. The 80286 microprocessor built upon the addressing scheme of the 8086 microprocessor by adding virtualization. The 80286 may run in either real mode or protected mode (referred to hereinafter as '286 protected mode). FIG. 2 provides a block diagram of the addressing scheme of '286protected mode. A 32-bit virtual address 22 is used in '286 protected mode. Bits 16–31 of the virtual address 22 hold a segment selector 24. Bits 0–15 of the virtual address 22 hold a 16-bit offset 26.

The segment selector 24 is used as an index to retrieve an entry 30 in the segment descriptor table 28. The segment descriptor table 28 is an address translation mechanism for mapping a base address of a segment in the virtual address space into a base address of a segment in the physical address space. The entry 30 points to the base address of a segment 32. The offset 26 of the virtual address 22 points to a memory location 34 in the physical memory 16. The address of memory location 34 is calculated by using the offset 26 to locate the address relative to the base address held in entry 30 of the segment descriptor table 28.

The 80386 microprocessor has a real mode of operation analogous to that employed in the 8086 microprocessor. In this mode of operation, the 80386 microprocessor can run programs written for the 8086 microprocessor. The 80386 also has a '386 protected mode that is roughly analogous to the '286 protected mode of the 80286 microprocessor. The '386 protected mode, however, differs from the '286 protected mode in that it employs paging and employs a 48-bit virtual address rather than a 32-bit virtual address.

FIG. 3 provides a block diagram of the addressing scheme employed in '386 protected mode. In '386 protected mode, the 80386 microprocessor employs a 48-bit virtual address 36. Bits 0–31 of the virtual address 36 hold an offset value 40, and bits 32–47 hold a selector, that is used as an index for an entry 44 in a segment descriptor table 42. Entry 44 holds the base address for a segment. The base address held in entry 44 is added to the 32-bit offset 40 by a summer 46 to yield a linear address 50.

Linear address 50 is then passed to a paging mechanism 52. Paging mechanism 52 includes page directories and tables that are used to translate the linear address 50 into a 32-bit physical address 54. The physical address 54 then is used to specify a entry 56 within physical memory 16.

The 80386 and 80286 microprocessors differ from the 8086 microprocessor in that they employ a number of privilege levels. The privilege levels range from level 0 to level 3, as shown in FIG. 4a. The privilege levels are sometimes referred to as rings (e.g., ring 0, ring 1, ring 2 and ring 3). Ring 0 is the greatest privilege level, and ring 3 is the lowest privilege level. Each memory segment in the address space of the 80386 microprocessor has a ring associated with it. In order for a code segment that is executing to gain access to a memory segment, the ring of the code segment must be equal or greater than the ring of the memory segment being accessed. For example, a code segment having a ring of 0 has access to memory segments at rings 0, 1, 2 or 3. In contrast, a code segment at ring 3 may only access a memory segment at ring 3.

The privilege levels are provided to enhance security within the system. In particular, memory segments that require a high level of security are placed in ring 0, and memory segments requiring a lower level of security are placed in ring 3. Typically, the operating system kernel is placed in ring 0, and applications are run at ring 3 to prevent applications from altering the contents of the operating system kernel.

The 80386 microprocessor provides an additional mode of operation that is known as the virtual 8086 mode (V86). In V86 mode, a protected mode operating system may run real mode code in a virtualized manner. The operating system may provide a separate virtual machine for different real mode programs running on the microprocessor. Each virtual machine is an environment that is created through a combination of microprocessor capabilities and operating system software. Only one of the virtual machines is actively running on the microprocessor at any point in time. The operating system may context switch between the virtual machines to change the currently active virtual machine. FIG. 4b provides an example of the use of the privilege levels in V86 mode. The kernel of the operating system is run at privilege ring 0. Virtual machines VM1, VM2 and VM3, in contrast, are run at ring 3. In the example of FIG. 4b, the WINDOWS operating system and WINDOWS-based applications are being run on VM1. DOS is being run on VM2, and DOS applications are being run on VM3.

The WINDOWS, version 3.0, operating system, by Microsoft Corporation, is configured to run on either an 80286 microprocessor or an 80386 microprocessor. The WINDOWS, version 3.0, operating system runs in "standard mode" when implemented on a 80286 microprocessor or an 80386 microprocessor with less than two megabytes of memory (see FIG. 5). In standard mode, the microprocessor runs in real mode or '286 protected mode. WINDOWS, version 3.0, runs in "enhanced mode" when it is run on a 80386 microprocessor having at least two megabytes of memory. When the WINDOWS, version 3.0, operating system is run in enhanced mode, the 80386 microprocessor runs in protected '386 mode or V86 mode (see FIG. 5).

Handling of hardware interrupts while the microprocessor is running in '286 protected mode may be cumbersome because of the required switching between modes. The steps performed in handling an interrupt in such an instance are depicted in FIG. 6. Initially, a hardware interrupt is received in '286 protected mode (step 60). In order to handle the interrupt, the microprocessor switches to real mode (step 62). When the interrupt is generated, a pointer to the entry point of an interrupt handler routine is created. The pointer is a physical address like the address 10 shown in FIG. 1. The interrupt handler routine is then executed to handle the interrupt (step 64 in FIG. 6), and when the interrupt handler routine has completed, the microprocessor switches back to '286 protected mode (step 66). The switching from '286 protected mode to real mode and then from real mode to '286 protected mode incurs a large amount of overhead.

The handling of interrupts in enhanced mode may also be cumbersome. In enhanced mode, all hardware interrupts automatically switch the interrupted microprocessor into ring 0. The system then must switch back to ring 3, because hardware interrupts are handled by interrupt handler routines that execute at ring 3. The resulting switching back and forth between rings is time consuming and burdensome.

The handling of a hardware interrupt in enhanced mode of WINDOWS, version 3.0, will now be described in more detail with reference to FIGS. 7a and 7b. Initially, a hardware interrupt is received by a microprocessor (step 114 in FIG. 7b). The hardware interrupt has an interrupt vector number (see FIG. 7a) that is used as an index into an interrupt descriptor table (IDT) 91. The microprocessor uses the interrupt vector number as an index in retrieving an entry 93 in the IDT 91. The IDT entry 93 typically includes a selector 79 that points to a global descriptor table (GDT) entry 92. The IDT entry 98 also includes an offset 77. The GDT entry 92 has a pointer to kernel code 70, which resides in physical memory 95. To avoid confusion, the role of paging mechanism is omitted from this discussion. The microprocessor then executes the kernel code 70.

The kernel code 70 is stored in a memory segment at ring 0. Data 72 for the kernel is also stored at ring 0. (Note pointer 94 in GDT 97 that points to data 72.) The transfer to the kernel code 70 involves a switch to ring 0 (step 116 in FIG. 7b). The kernel code 70 (FIG. 7a) determines which virtual machine should process the interrupt (step 118 in FIG. 7b). If the virtual machine that is to handle the interrupt is not the currently active virtual machine, a context switch is performed (step 120). The kernel code 70 (FIG. 7a) then transfers control to the appropriate interrupt handler in virtual machine VM0, VM1 or VM2. If the interrupt is directed to VM0, the kernel code 70 transfers control to the interrupt handler 78. In particular, the kernel code 70 provides an address for an entry point in the interrupt handler 78. The entry point address includes a selector that points to entry 100 in LDT1. Entry 100 includes a pointer to the page frame holding the interrupt handler code 78 that is resident in physical memory 95. An offset is included in the entry point address, and the offset is used with the pointer to specify the entry point in the interrupt handler. LDT1 also includes an entry 96 that points to code for VM0 and an entry 98 that points to data 76 for VM0.

If, however, the interrupt should be handled by VM1, the kernel code 70 passes control to interrupt handler 84. The kernel code specifies a virtual address that includes a selector pointing to entry 104 in LDT2. Entry 104 at LDT2 holds a pointer to interrupt handler code 84. The offset of the virtual address is used with the pointer to specify the entry point. LDT2 also includes an entry 102 that points to code 80 for VM1 and an entry 107 that points to data 82 for VM1.

If the interrupt is to be handled by VM2, the kernel code 70 passes control to interrupt handler 90 at a linear address which is translated to a physical address using LDT3. Specifically, the kernel codes specifies a virtual address that includes a selector pointing to entry 112 in LDT3. Entry 112 in LDT3 includes a pointer to the page frame holding the interrupt handler code 90. The offset of the virtual address is used with the pointer to specify the entry point in the interrupt handler routine. LDT3 also includes an entry 108 that points to code 86 for VM2 and an entry 110 that points to data 88 for VM2.

All of the interrupt handlers 78, 84 and 90 are stored in memory segments at ring 3. Thus, when control is transferred to the interrupt handler, a switch must be made to ring 3 (step 122 in FIG. 7b). Once the interrupt has been handled, the system signals the end of the interrupt (step 126). Generally, the end of an interrupt is signalled by writing into a hardware register.

Another proposed solution has been to determine what mode the microprocessor is in when it receives an interrupt and then invoking a unique interrupt handler routine based upon the determination of the mode. Separate code is provided for interrupt handlers of each mode. Unfortunately, there is a great deal of overhead in providing the procedures to determine the current mode of the system and providing separate interrupt handlers for each mode.

SUMMARY OF THE INVENTION

In accordance with a first aspect of the present invention, a method is executed in a data processing system having a processor for executing instructions in storage for storing information. In accordance with this method of the first aspect of the present invention, code is provided for an interrupt handler that may be run in multiple processor modes. A determination is made regarding the current processor mode for the processor. This method may further comprise the additional step of storing the current processor mode in storage so that the current processor mode is determined by examining the stored current processor mode. The current processor mode may be one in which the instructions that are executed by the processor use virtual addresses. Conversely, the current processor mode may be one in which the instructions that are executed by the processor use physical addresses. Still further, the interrupt handler may be stored in a portion of the storage that is accessible by the processor in either of the processor modes.

In accordance with another aspect of the present invention, a method of handling interrupts is executed in a data processing system having a processor for executing instructions and a storage for storing information. In accordance with the method of this aspect of the present invention, an indicator of a current processor mode is stored in storage. Also stored in storage is information to be used by the interrupt handler when run in the first processor mode and information to be used by the interrupt handler when run in a second processor mode. It is then determined what the current processor mode is. If the current processor mode is the first mode, the interrupt handler is run using the stored information for the first processor mode. On the other hand, if the current processor mode is the second processor mode, the interrupt handler is run using the stored information for the second processor mode.

In accordance with the second aspect of the present invention, the first processor mode may be one in which the instructions that are executed by the processor use virtual addresses. The second processor mode may comprise a processor mode in which the instructions that are executed by the processor use physical addresses. When the first processor mode is such that the instructions executed by the processor use virtual addresses, the information to be used by the interrupt handler may be values that specify segments of memory in a virtual memory address space, such as an index to an entry in a segment descriptor table.

The first processor mode may also be a processor mode in which the instructions that are executed by the processor use physical addresses. In this case, the information to be used by the interrupt handler in the first processor mode includes values that specify memory blocks in a physical address space. The information to be used by the interrupt handler when run in the first processor mode may be offset by a fixed offset from the information to be used by the interrupt handler when run in the second processor mode. The fixed offset may be specified by the indicator of the current processor mode. In fact, the indicator of the current processor mode may be equal to the fixed offset.

The storage preferably comprises a memory that is logically partitioned into segments of contiguous blocks of memory. When such memory is employed, the first processor mode may be a first privilege level, and the second processor mode may be a second privilege level. The privilege levels are associated with each segment of memory such that in order for the processor to gain access to a segment of the memory, the processor must be executing in a processor mode having a privilege level equal to or greater than the privilege level of the memory segment.

The method of the second aspect of the present invention may comprise the additional steps of providing a control procedure for the first processor mode and providing a control procedure for the second processor mode. The control procedure for the first processor mode is called when the current processor mode is the first processor mode. Similarly, the control procedure of the second processor mode is called when the current processor mode is the second processor mode.

In accordance with yet another aspect of the present invention, the data processing system includes a memory for holding data and code. The memory holds an interrupt handler routine that is executable in multiple processor modes. The memory also holds an indicator of a current processor mode, the information to be used by the interrupt handler when run in a first processor mode, and the information to be used by the interrupt handler when run in a second processor mode. The data processing system further includes a processor for executing the interrupt handler in the first processor mode when the current processor mode is the first processor mode and for executing the interrupt handler on the second processor mode when the current processor mode is the second processor mode. The memory may further hold a segment descriptor table for translating virtual addresses into physical addresses. In addition, the indicator of the current processor mode may specify an offset that is used by the processor to retrieve the information to be used by the interrupt handler in the current processor mode.

BRIEF DESCRIPTION OF THE DRAWINGS

A preferred embodiment of the present invention will be described below relative to the drawings.

FIG. 9b is a more detailed block diagram of the data block 168 of FIG. 9a.

FIG. 10b is a more detailed block diagram of the data block 168 of FIG. 10a.

FIG. 11 is a flowchart illustrating steps performed by the initialization routine 196 of FIG. 10a.

DETAILED DESCRIPTION OF THE INVENTION

A preferred embodiment of the present invention provides a mechanism for sharing common code to handle interrupts across multiple processor modes. The term "processor modes" in the present context is meant to include modes such as real mode and protected mode, as well as privilege levels such as ring 0 and ring 3. A preferred embodiment will be described below relative to implementations on the 80286 microprocessor and the 80386 microprocessor. Moreover, the preferred embodiment will be described relative to an implementation on the WINDOWS operating system. Those skilled in the art will appreciate that the invention is not limited to use of an 80286 microprocessor, an 80386 microprocessor or the WINDOWS operating system. The preferred embodiment is described below relative to these entities merely for illustrative purposes.

Figure 1:
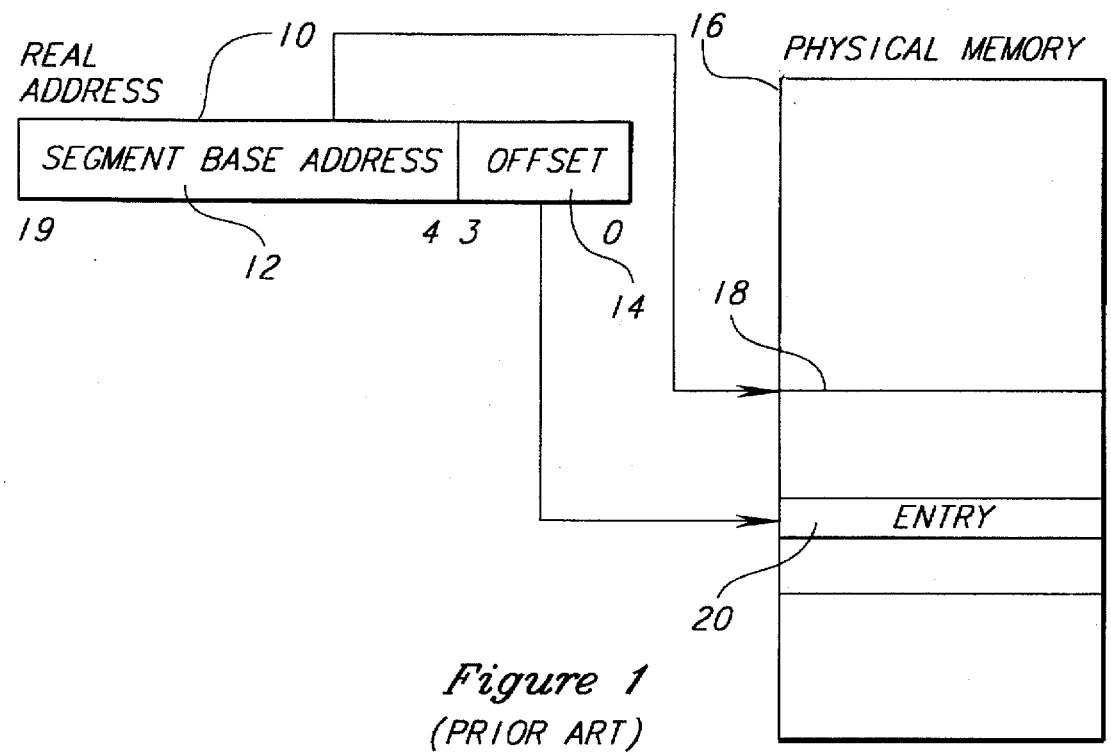
FIG. 1 depicts the addressing scheme used in real mode in the 8086 microprocessor.
Figure 2:
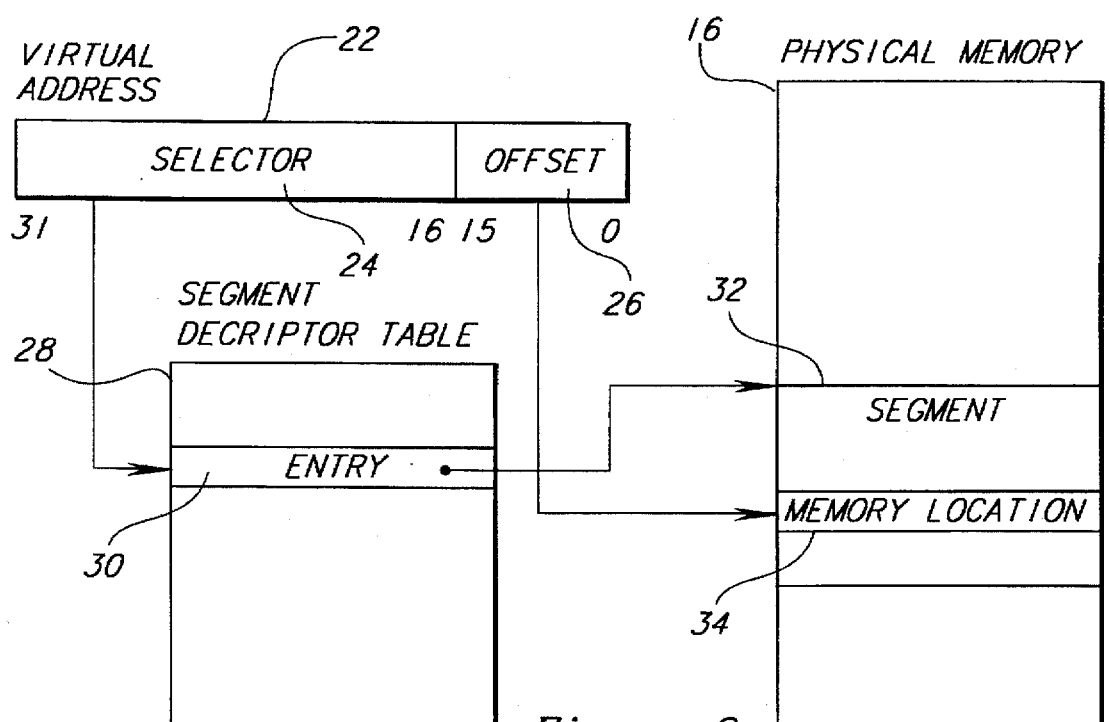
FIG. 2 depicts the addressing scheme used in '286 protected mode on the 80286 microprocessor.
Figure 3:
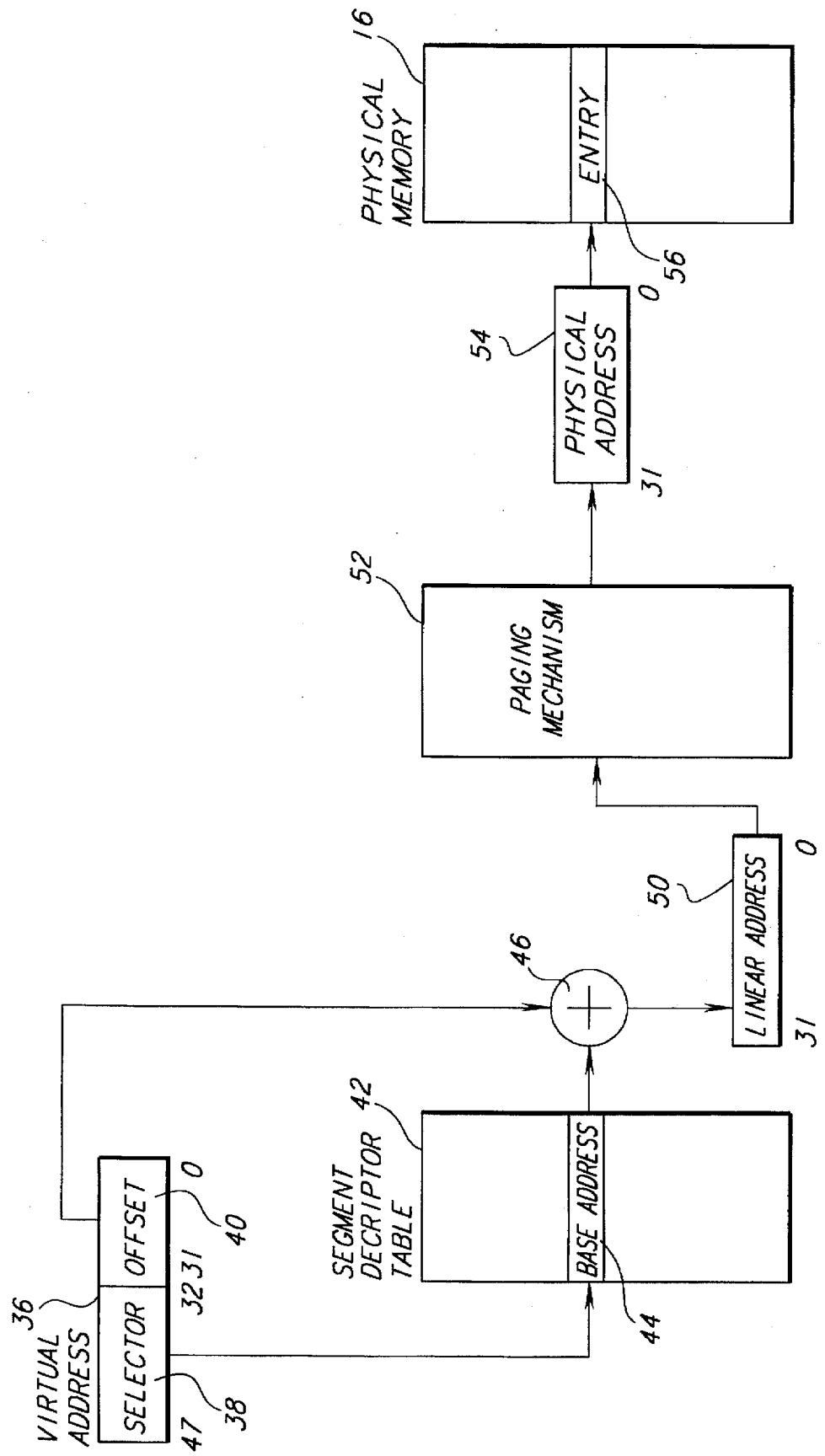
FIG. 3 depicts the addressing scheme used in '386 protected mode on the 80386 microprocessor.
Figure 4A:
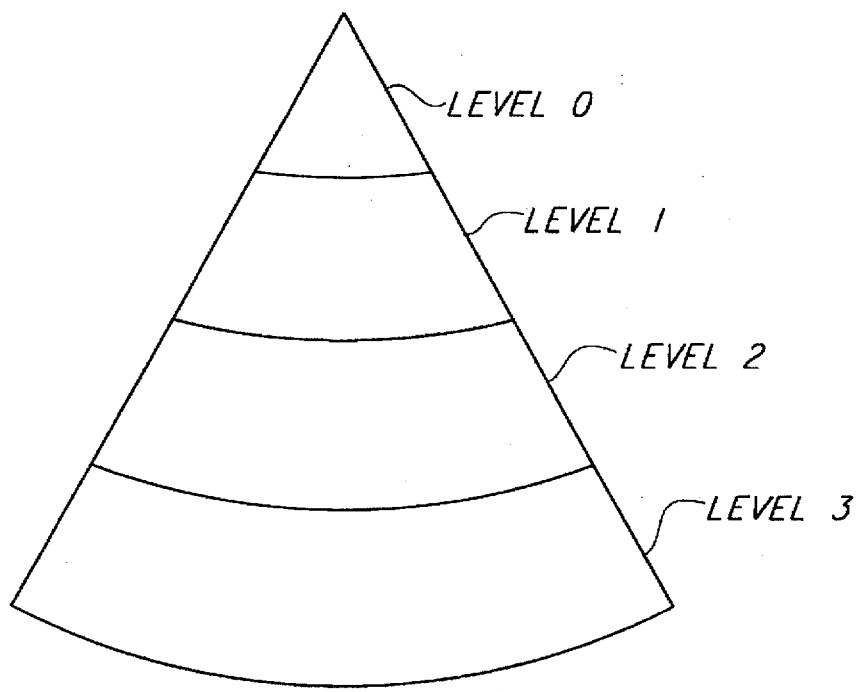
FIG. 4a depicts the privilege level scheme employed in the 80386 microprocessor.
Figure 4B:
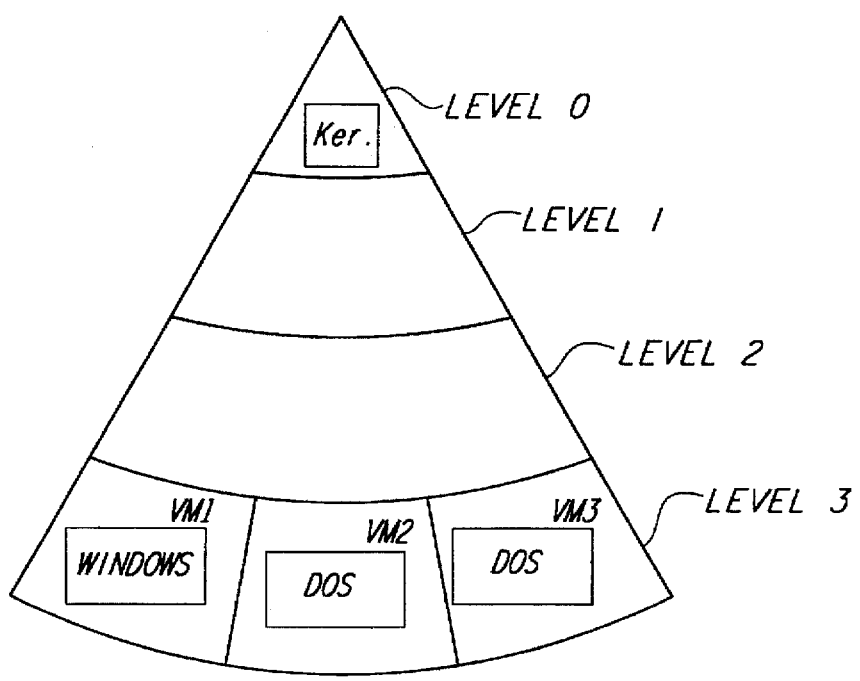
FIG. 4b depicts how the privilege levels of FIG. 4a are employed in the VM mode of the 80386 microprocessor.
Figure 5:
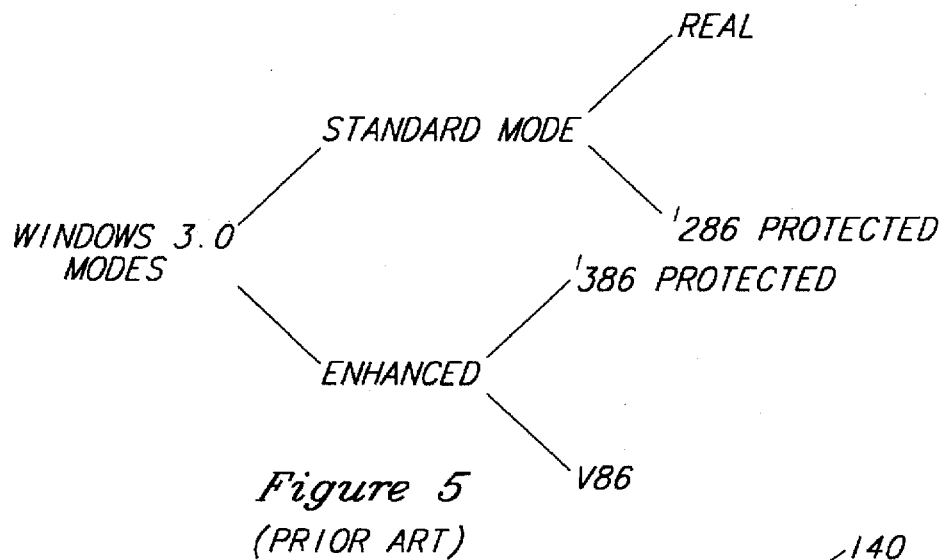
FIG. 5 is a diagram illustrating the relationship between processor modes and the modes of the WINDOWS, version 3.0, operating system.
Figure 8:
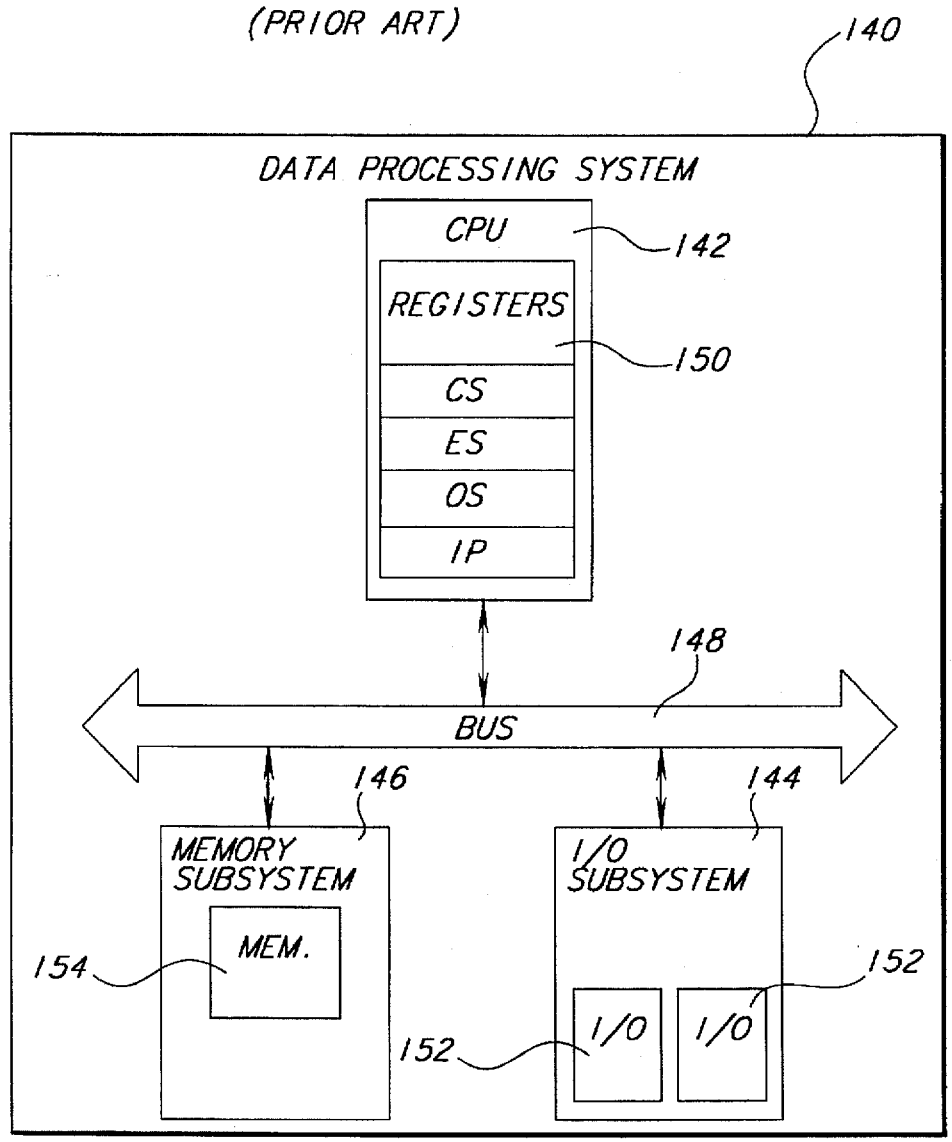
FIG. 8 is a block diagram of an illustrative data processing system for practicing the present invention.
Figure 6:
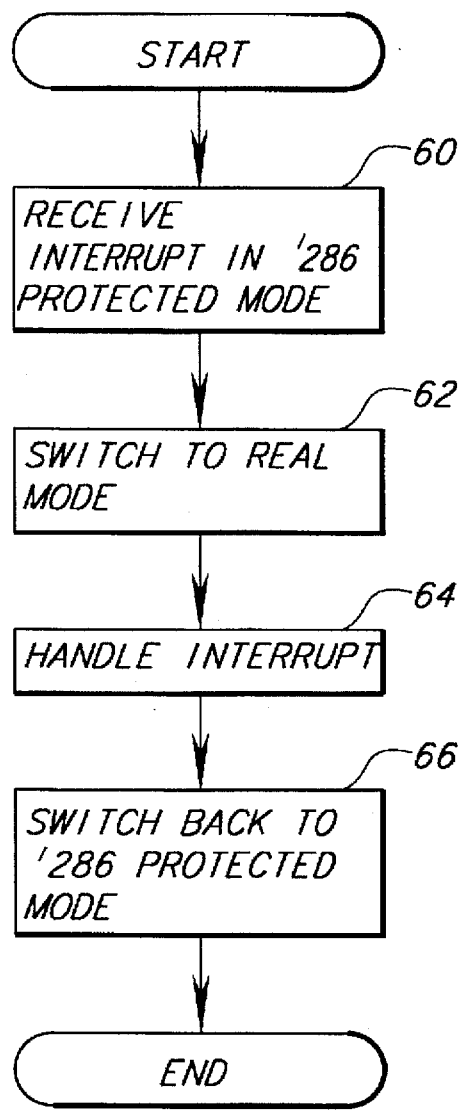
FIG. 6 is a flowchart illustrating the steps involved in handling interrupts in standard mode.

FIG. 8 shows a block diagram of a data processing system 140 that is suitable for implementing the preferred embodiment described herein. This data processing system is merely illustrative and should not be viewed as restricting the present invention. Those skilled in the art will know other suitable data processing system configurations for practicing the present invention.

The data processing system 140 includes a central processor unit (CPU) 142, a memory sub-system 146, having a memory 154 and an input/output (I/O) sub-system 144, having I/O devices 152. The CPU 142, the memory sub-system 146 and the I/O sub-system 144 are interconnected through a bus 148. The CPU 142 includes registers 150, such as CS and ES segment registers, an instruction pointer (IP) register and a DI general purpose register. The CPU 142 may be realized as an 80386 microprocessor or an 80286 microprocessor. In the 80386 microprocessor, the DI general purpose register constitutes the lower 16 bits of an EDI general purpose register. In the 80286 microprocessor, the DI register is a separate register that is not part of a larger register.

Figure 9C:
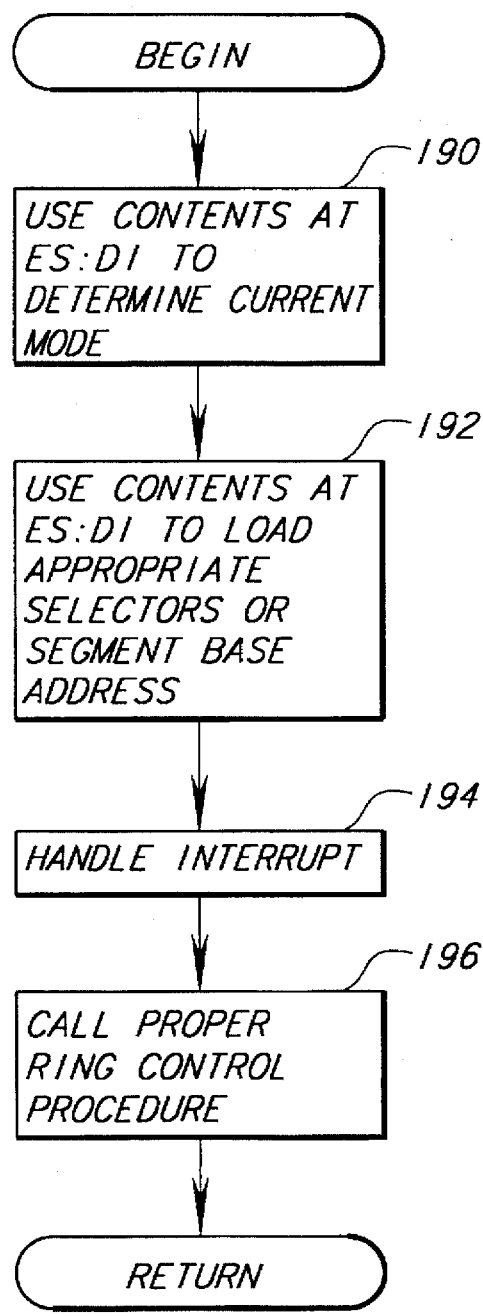
FIG. 9c is a flowchart illustrating the steps performed by the interrupt handler routine of a preferred embodiment of the present invention in standard mode.
Figure 7A:
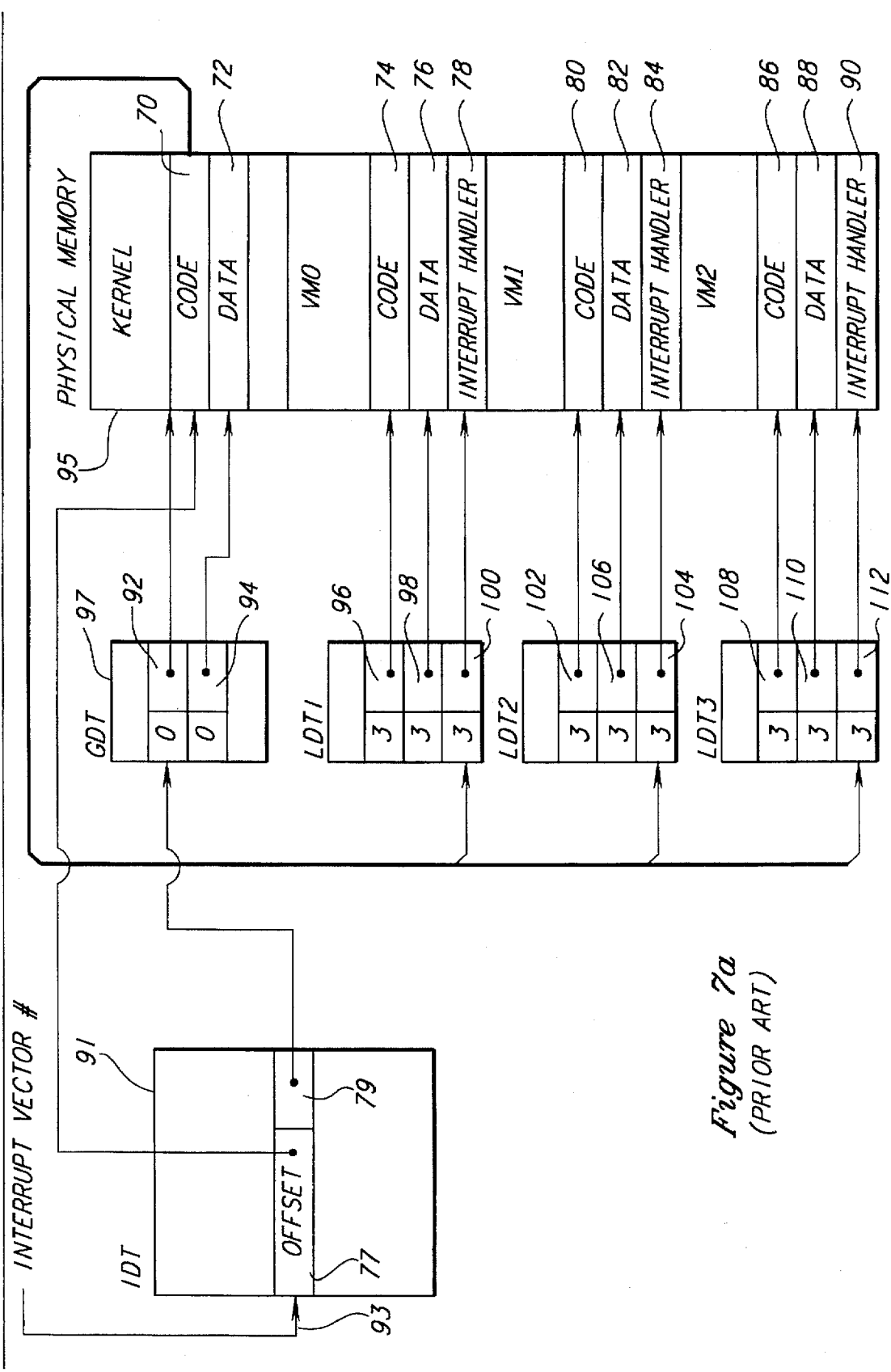
FIG. 7a is a diagram illustrating the handling of an interrupt in enhanced mode.
Figure 7B:
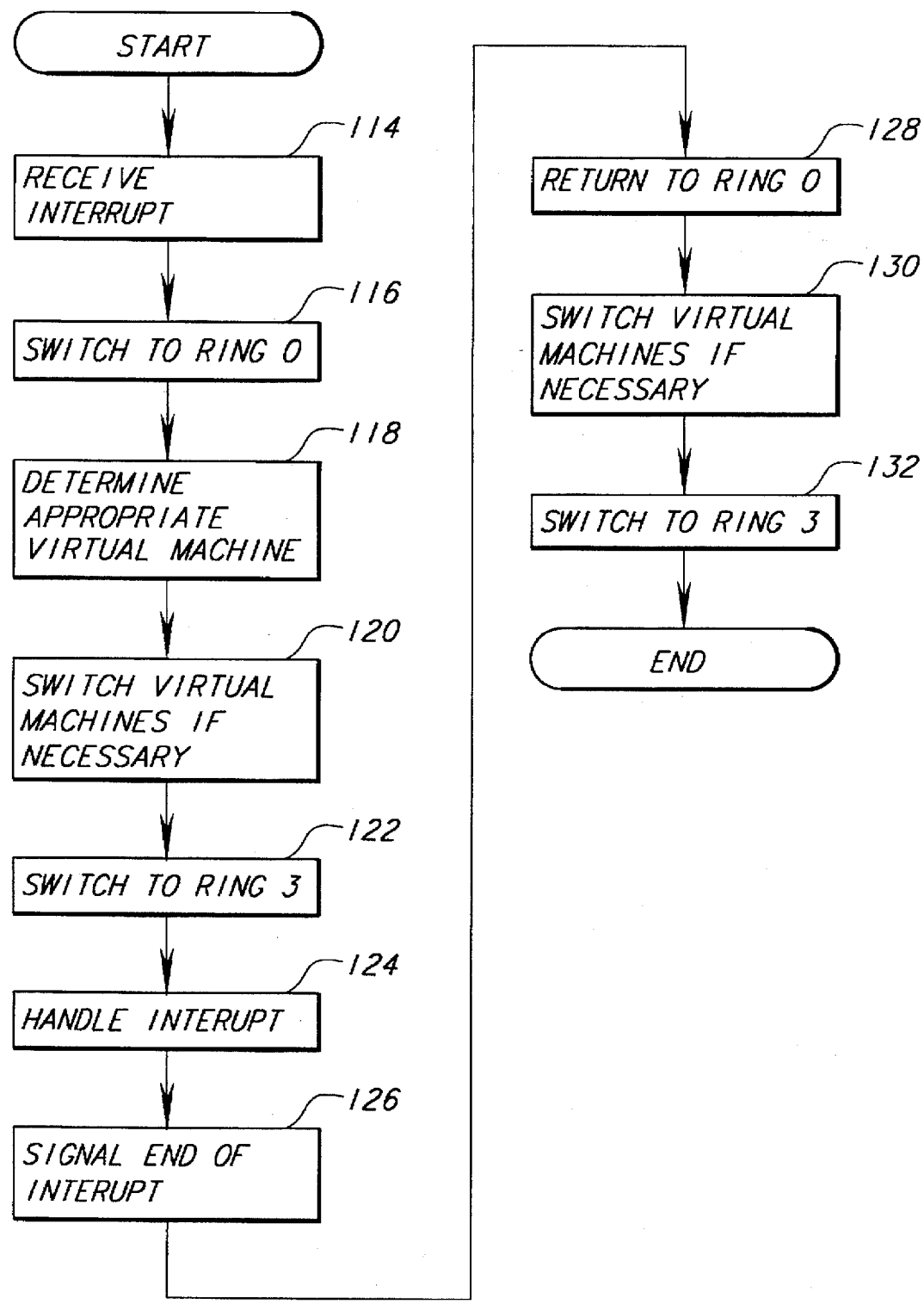
FIG. 7b is a flowchart of the steps involved in handling an interrupt in enhanced mode.
Figure 9A:
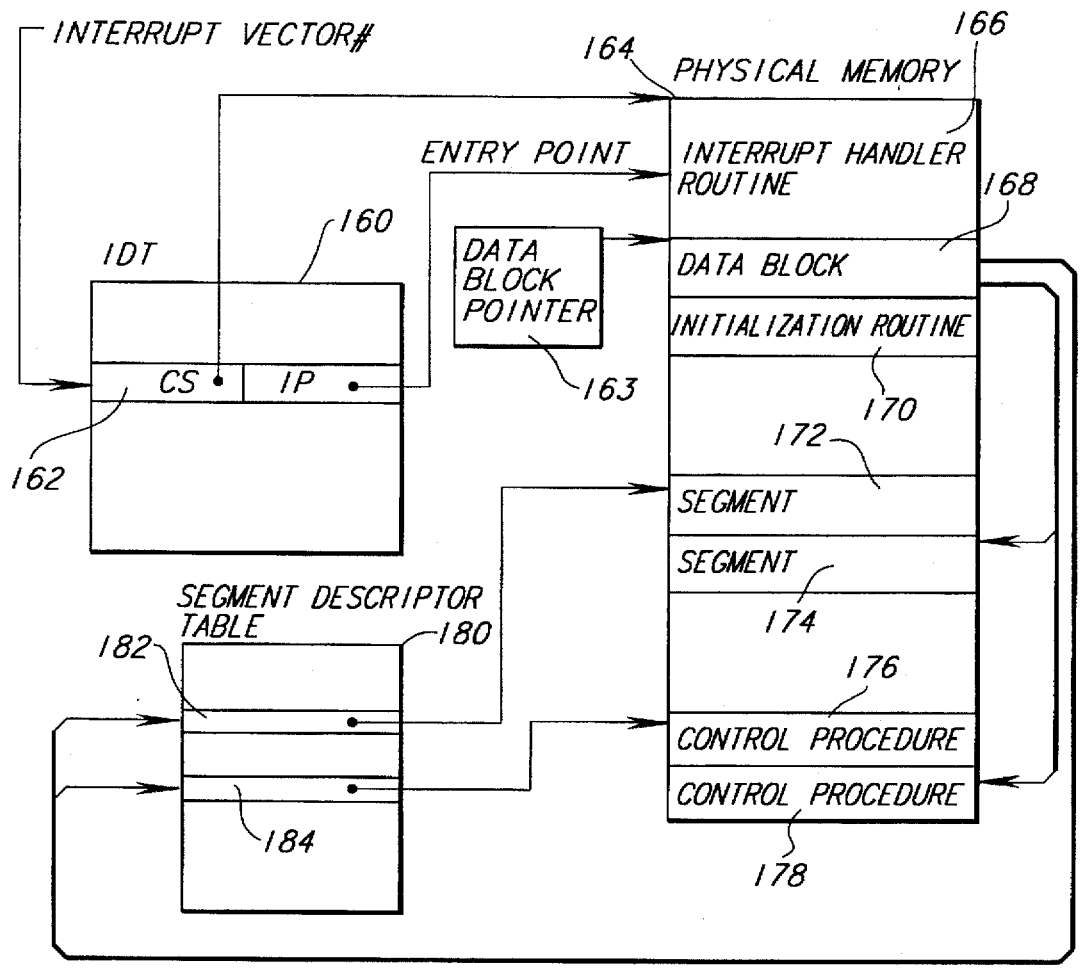
FIG. 9a is a block diagram illustrating how a preferred embodiment of the present invention handles an interrupt in standard mode.

The preferred embodiment described herein minimizes the overhead involved in handling interrupts in '286 protected mode by adopting an approach like that depicted in FIG. 9a. The physical memory 164 holds an interrupt handler routine 166, a data block 168 and an initialization routine 170, which are all part of a communications driver. The physical memory also holds segments 172 and 174. The system of FIG. 9a further includes an interrupt descriptor table (IDT) 160 and a segment descriptor table 180. In general, the approach of FIG. 9a is to store a data block 168 with an interrupt handler routine 166. A pointer to this data block is provided when the interrupt handler routine 166 is invoked. The interrupt handler routine 166 uses the data in the data block 168 to determine the mode in which the interrupt handler should operate. The data block 168 includes pointers to information that is used by the interrupt handler routine in each of the respective processor modes.

The system of FIG. 9a operates as follows. Each hardware interrupt has an interrupt vector number associated with it. This interrupt vector number is used as an index into the IDT 160 to entry 162. The IDT uses the vector number of the interrupt to determine what interrupt handler routine it should invoke to handle the interrupt and to determine the proper entry point in the interrupt handler. The entry 162 that is indexed by the interrupt vector includes a code segment (CS) field that points to the segment holding the interrupt handler routine 166. Entry 162 also includes an instruction pointer (IP) field that points to the entry point within the interrupt handler routine 166. The CS field is loaded into the CS segment register of the CPU, and the IP field is loaded into the instruction pointer of the CPU 142 (FIG. 8).

The CPU 142 then begins executing the interrupt handler routine 166 (FIG. 9a) at the entry point as specified by the CS and IP registers. The interrupt handler routine initially executes in real mode. The interrupt handler routine 166 is passed a data block pointer 163, which points to the data block 168. The steps performed by the interrupt handler routine 166 are shown in the flowchart of FIG. 9c. Initially, the interrupt handler routine looks to entry 201 (FIG. 9b) in the data block 168. Entry 201 holds a mode indicator (step 190 in FIG. 9c). Entry 201 is at an address specified by the selector held in segment register ES and an offset held in the DI register. The proper values are loaded into ES and DI during initialization of the system. Entry 201 holds a value of either "0" or "4". A value of "0" specifies that the interrupt handler is to be performed in '286 protected mode, and a value of "4" indicates that the interrupt handler is to be executed in real mode.

Once the interrupt handler routine 166 (FIG. 9a) has examined the contents of entry 201 (FIG. 9b), it knows the mode in which it is to be executed. Hence, the interrupt handler loads appropriate selectors or segment base addresses to handle the interrupt (step 192 in FIG. 9c). The value in entry 201 (FIG. 9b) is used to directly obtain the selectors or segment base addresses (depending on the selected mode). In particular, each selector to be used by the interrupt handler in '286 protected mode is separated from the corresponding segment to be used by the interrupt handler in real mode by 4 bytes. Therefore, an offset of "0" causes the selector to be chosen, whereas an offset of "4" causes the segment base address to be chosen. For example, when entry 201 (FIG. 9b) holds a value of "0", the offset is "0", and the selector 203 at byte 20 is used by the interrupt handler routine 166. A value of "0" is an indication that the interrupt handler is to be run in '286 protected mode and, therefore, virtual addressing and selectors are used. On the other hand, if a value of "4" is stored in entry 201, the interrupt handler 166 routine is to be run in real mode and real addresses are used. The offset of "4" is used to obtain the segment base address 205 at byte 24.

FIG. 9a shows how the selector 203 (FIG. 9b) or segment base address 205 is used to access segment 172 or 174, respectively. Selector 203 (FIG. 9b) points to entry 182 in the segment descriptor table 180. Entry 182 points to a segment 172. The segment base address 205 (FIG. 9b) does not point to an entry in the segment descriptor table 180; rather, it directly specifies the address for segment 174. It should be appreciated that although only one such selector and segment base address pair are shown in FIG. 9b, the data block may include multiple pairs of such selectors and segment base addresses.

Once the interrupt has been fully handled, the interrupt handler routine seeks to make it known that the interrupt is finished. To signal the end of an interrupt, the interrupt handler generally calls a control procedure (step 196 in FIG. 9c). The preferred embodiment described herein provides the ability to call the control procedure in either real mode or '286 protected mode, depending upon the value stored in entry 201 (FIG. 9b). The value in entry 201 is used as an offset to call either a selector 207 or a selector 208 in a fashion analogous to that described above.

In FIG. 9b, it is illustratively shown that selector 207 is stored at byte 40, which is the byte at offset "0". The offset "0" selector 207 is called when the control procedure is to be executed in '286 protected mode. This selector 207 is then used to access entry 184 in segment descriptor table 180. Entry 184 includes a pointer to control procedure 176. When the control procedure is to be executed in real mode, entry 201 (FIG. 9b) holds a value of "4". The segment base address 208 at byte 44 of data block 168 is used. As a result, a control procedure 178 is directly called using the segment base address 208.

Figure 10A:
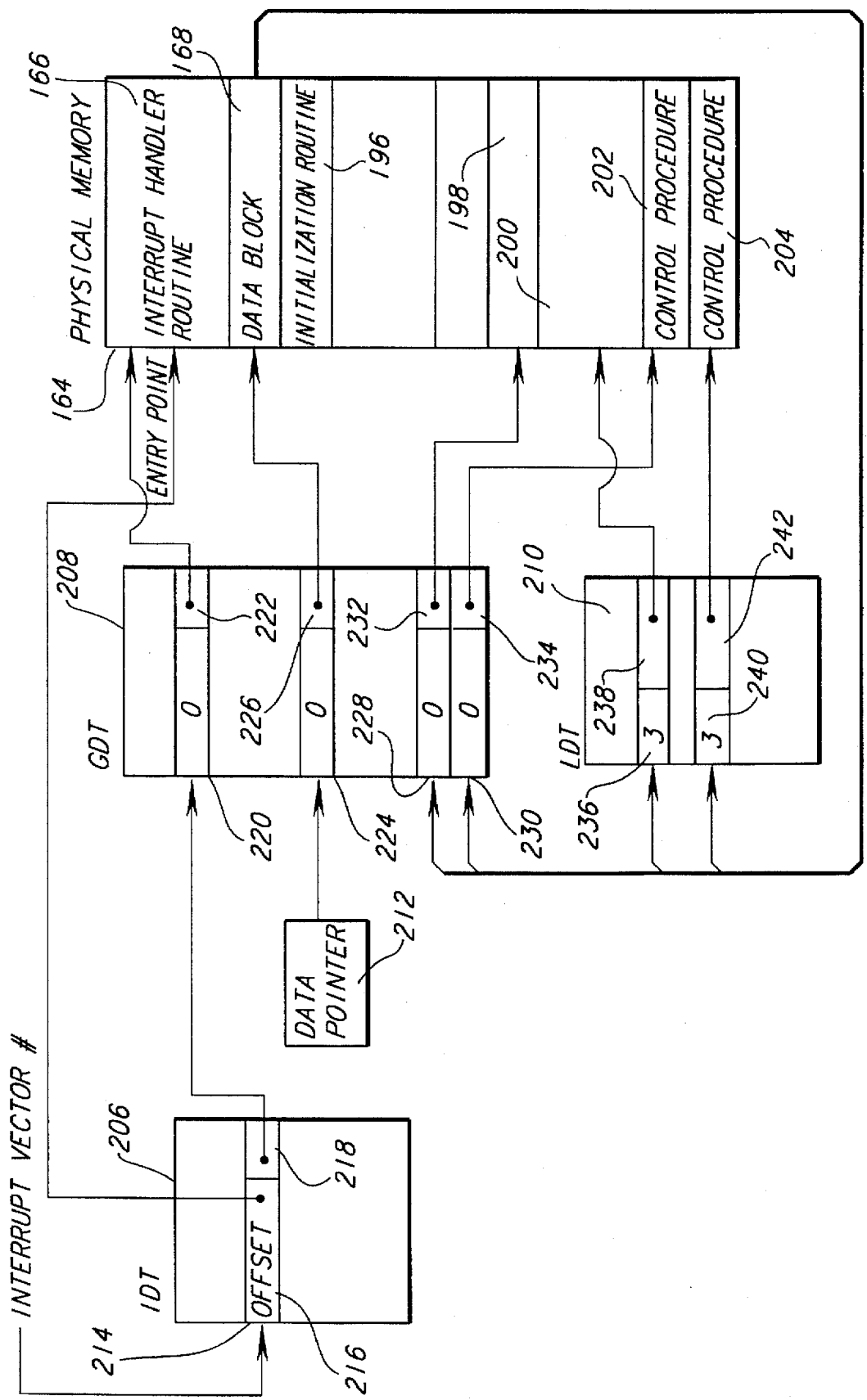
FIG. 10a is a block diagram that illustrates how interrupts are handled by a preferred embodiment of the present invention in enhanced mode.

In enhanced mode, the preferred embodiment described herein operates in a manner similar to the above-described approach for standard mode. The differences between operation in enhanced mode and operation in standard mode will become more apparent from the discussion below. FIG. 10a illustrates how interrupts are handled in enhanced mode. A physical memory 164 holds the interrupt handler routine 166, a data block 168 and an initialization routine 196. In addition, the physical memory 164 holds two pages of memory 198 and 200, as well as control procedures 202 and 204. Control procedure 202 is designed to operate in ring 0, while control procedure 204 is designed to operate in ring 3. A GDT 208 and LDT 210 are provided to point to page frames within the physical memory 164. An IDT 206 is provided to specify what interrupt handler routines are to be used and to specify the entry points into such interrupt handler routines.

In enhanced mode, the hardware interrupt has an interrupt vector number associated with it. This interrupt vector number serves as an index into the IDT 206. This IDT 206 differs somewhat from the IDT 160 used in standard mode. The indexed entry 214 in the IDT 206 includes an offset 216 and a selector 218. The selector 218 in the IDT entry 214 is used to point to an entry 220 in the GDT 208. The entry 220 in the GDT 208 includes a field that specifies the privilege level of the interrupt handler routine that is pointed to by selector 222. In the illustrative case of FIG. 10a, the selector points to the interrupt handler routine 166, which is run at ring 0 initially. The entry point into the interrupt handler routine 166 is specified by the offset 216 of the entry 214 in the IDT 206.

The interrupt handler routine 166 begins executing at the entry point specified by the offset 216. A flowchart of the steps performed by the interrupt handler routine is provided in FIG. 10c. Initially, the ES and DI registers are used to specify the address of the entry in the data block 168 which holds a ring indicator (step 250 in FIG. 10c). The ring indicator is held at entry 258 of the data block, as shown in the more detailed depiction of the data block in FIG. 10b. Entry 258 holds a value of "0" or "4". A value of "0" in entry 258 indicates that the interrupt handler is to run at ring 3. On the other hand, a value of "4" indicates that the interrupt handler is to run at ring 0.

Figure 10C:
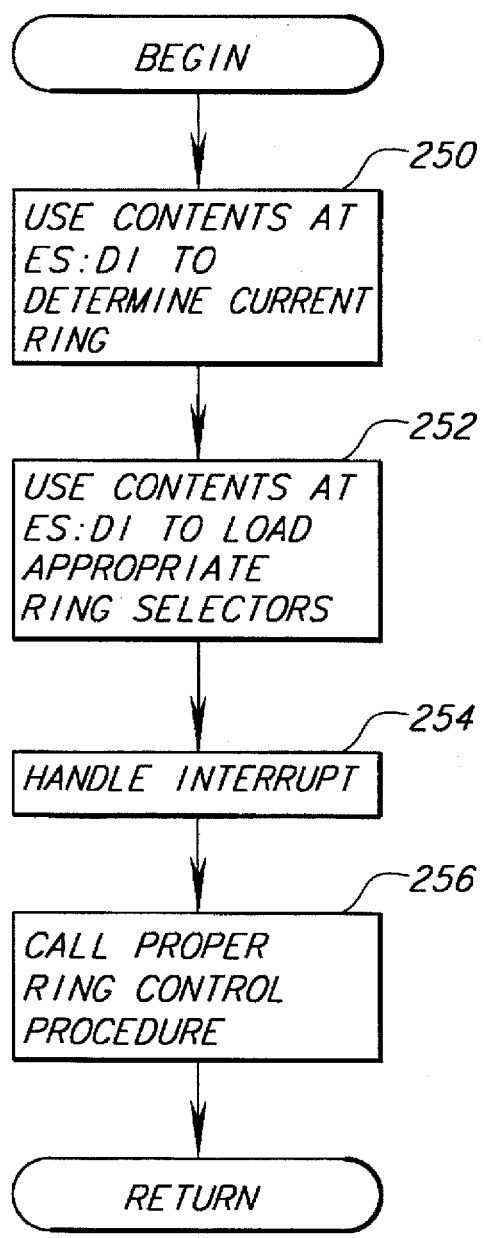
FIG. 10c is a flowchart illustrating the steps performed by a preferred embodiment of the present invention in handling interrupts in enhanced mode.

The ring indicator at entry 258 is used as an offset to obtain the appropriate selectors (step 252 in FIG. 10c). The selectors for information to be used by the interrupt handler routine 166 (FIG. 10a) when run at ring 0 are offset by 4 bytes from the selectors to be used by the interrupt handler routine when run at ring 3. For instance, as shown in FIG. 10b, when the interrupt handler is to be run at ring 3, a "0" offset value in entry 258 directs the interrupt handler to the selector 260 at byte 20. Selector 260 points to entry 236 in the LDT 210. Entry 236 includes a selector 238 that points a page frame of memory 200. Entry 236 contains bits indicating the privilege level of page frame 200. In this instance, the bits in entry 236 indicate that page frame 200 is stored at ring 3.

When the interrupt handler is to be run at ring 0, an offset of "4" directs the interrupt handler to selector 262 at an offset of 4 bytes relative to the corresponding selector for ring 3. The selector 262 points to an entry 228 in the GDT 208. Entry 228 includes a selector 232 that points to page frame 198. Bits in entry 228 specify that page frame 198 has a privilege level of 0. Hence, when the interrupt handler runs at ring 0, selector 262 (FIG. 10b) is used. In contrast, when the interrupt handler runs at ring 3, selector 260 is used.

Once the interrupt handler 166 (FIG. 10b) knows the selectors 260 or 262 it is to use, the interrupt handler finishes handling the interrupt (step 254 in FIG. 10c). The interrupt handler 166 (FIG. 10a) then determines which control procedure to call so as to signal the end of the interrupt (256). The calling of the control procedure is also dictated by the offset.

With an offset of "0", the interrupt handler 166 (FIG. 10a) chooses a selector 264 to invoke the control procedure that executes at ring 3. In FIG. 10b, the selector 264 is held at byte 40 and points to entry 240 in LDT 210. Entry 240 (FIG. 10a) includes a pointer 242 to the page frame holding control procedure 204. Entry 240 also includes bits that specify that the control procedure 204 executes at ring 3.

A selector 266 (FIG. 10b) for a control procedure 202 (FIG. 10a) that runs at ring 0 is offset by 4 bytes from selector 264 (FIG. 10b) for the control procedure that runs at ring 3. Selector 266 is shown in FIG. 10b as being at byte 44. Selector 266 points to entry 230 (FIG. 10a) in GDT 208. The entry 230 includes a pointer 234 that points to a page frame holding control procedure 202. The entry 230 also includes bits specifying that the control procedure 202 executes at ring 0.

Figure 11:
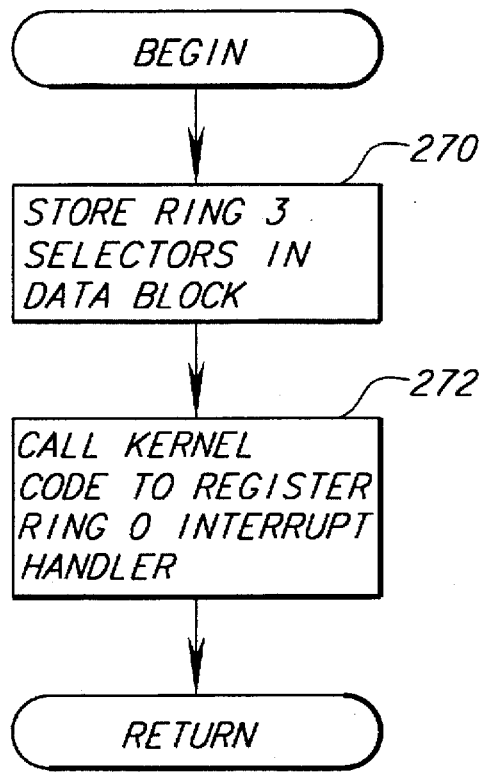

The data contained within data block 168 (FIG. 10b) is stored therein at initialization. To facilitate the storage of data in this data block 168, the initialization routine 196 (FIG. 10a) is invoked during system boot. FIG. 11 presents a brief flowchart of the steps performed by the initialization routine in enhanced mode. The initialization routine is responsible for storing the ring 3 selector 260 (FIG. 10b) in the data block (step 270 in FIG. 11). The initialization routine then calls the kernel code to register the ring 0 interrupt handler (step 272). The kernel registers the interrupt handler routine and then stores appropriate ring 0 selector 262 (FIG. 10b) in the data block 168.

While the present invention has been described with reference to a preferred embodiment thereof, those skilled in the art will know of various changes in form that may be made without departing from the spirit and scope of the claim invention as defined in the appended claims.

We claim:

1. In a data processing system having a processor for executing instructions and operating at different privilege levels, a storage for storing information and an interrupt handler for handling a type of interrupt, a method of handling interrupts comprising the steps of:

a) storing an indicator of a current privilege level of executing instructions in the storage;

b) storing information to be used by the interrupt handler when run in a first privilege level in the storage and storing information to be used by the interrupt handler when run in a second privilege level in the storage;

c) receiving an interrupt of the type handled by the interrupt handler;

d) in response to receiving the interrupt, determining the current privilege level by examining the indicator in storage;

e) running the interrupt handler using the stored information for the first privilege level in response to determining that the current privilege level is the first privilege level to avoid switching privilege levels; and f) running the interrupt handler using the stored information for the second privilege level in response to determining that the current privilege level is the second privilege level to avoid switching privilege levels.

2. In a data processing system that has a processor that runs in processor modes of real mode or protected mode and a storage for storing an interrupt handler for handling interrupts, a method comprising the computer-implemented steps of:

running the processor in the protected mode;

providing a data block along with the interrupt handler in the storage, said data blocks holding an offset value;

receiving an interrupt while the processor is running in the protected mode;

providing a data pointer to the data block for use by the interrupt handler;

with the interrupt handler, using the data pointer to locate the data block and examining the offset value in the data block; and using data at an offset specified by the offset value to run the interrupt handler in the protected mode without switching to the real mode.

3. In a data processing system having a processor that runs programs at different privilege levels and a storage for storing an interrupt handler for handling interrupts, a method comprising the computer-implemented steps of:

running a program on the processor at a first of the privilege levels;

providing a data block along with the interrupt handler in the storage, said data block holding an offset value;

receiving an interrupt while the program is run on the processor at a first of the privilege levels;

providing a data pointer to the data block for use by the interrupt handler;

with the interrupt handler, using the data pointer to locate the data block and examining the offset value in the data block; and using data at an offset specified by the offset value to run the interrupt handler at the first of the privilege levels.

4. In a data processing system having a processor for executing instructions and operating in different processor modes, a storage for storing information and an interrupt handler for handling a type of interrupt, a computer-readable storage medium holding instructions for performing a method of handling interrupts comprising the steps of:

a) storing an indicator of a current processor mode in the storage;

b) storing information to be used by the interrupt handler when run in a first processor mode in the storage and storing information to be used by the interrupt handler when run in a second processor mode in the storage;

c) receiving an interrupt of the type handled by the interrupt handler responds;

d) in response to receiving the interrupt, determining what the current processor mode is by examining the indicator in storage;

e) running the interrupt handler using the stored information for the first processor privilege level in response to determining that the current processor mode is the first mode to avoid switching processor modes; and f) running the interrupt handler using the stored information for the second processor mode in response to determining that the current processor mode is the second processor mode to avoid switching processor modes.

5. The computer-readable storage medium of claim 4 wherein the instructions for performing the step of storing information to be used by the interrupt handler when run in the first processor mode store information to be used by the interrupt handler when run in the first processor mode in which the instructions that are executed by the processor use virtual addresses.

6. The computer-readable storage medium of claim 5 wherein the instructions for performing the step of storing information to be used by the interrupt handler when run in the second processor mode store information to be used by the interrupt handler when run in the second processor mode in which the instructions that are executed by the processor use physical addresses.

7. The computer-readable storage medium of claim 5 wherein the instructions for performing the step of storing information to be used by the interrupt handler when run in the first processor mode store values that specify segments of memory in a virtual memory address space to be used by the interrupt handler when run in the first processor mode.

8. The computer-readable storage medium of claim 7 wherein the instructions for performing the step of storing values that specify segments of memory in a virtual address space store at least one index to an entry in a segment descriptor table.

9. The computer-readable storage medium of claim 4 wherein the instructions for performing the step of storing information to be used by the interrupt handler when run in the first processor mode store information in the storage to be used by the interrupt handler when run in the first processor mode in which the instructions that are executed by the processor use physical addresses.

10. The computer-readable storage medium of claim 9 wherein the instructions for performing the step of storing information to be used by the interrupt handler when run in the first processor mode in the storage store values that specify memory blocks in a physical address space.

11. The computer-readable storage medium of claim 5 wherein the instructions for performing the step of storing information to be used by the interrupt handler when run in the first processor mode store the information to be used by the interrupt handler when run in the first processor mode at a location in the storage that is offset by a fixed offset from a location that stores the information to be used by the interrupt handler when run in the second processor mode that is stored in the storage.

12. The computer-readable storage medium of claim 11 wherein the instructions for performing the step of storing the information to be used by the interrupt handler when run in the first processor mode store the information to be used by the interrupt handler at a location in the storage that is offset by a fixed offset specified by the indicator of the current processor mode.

13. The computer-readable storage medium of claim 12 wherein the instructions for performing the step of storing the indicator of the current processor mode in the storage store the fixed offset between the location in the storage that stores the information to be used by the interrupt handler when run in the first processor mode and the location in the storage that stores the information to be used by interrupt handler when run in the second processor mode as the indicator of the current processor mode.

14. The computer-readable storage medium of claim 4 wherein the storage is a memory that is logically partitioned into segments of contiguous blocks of memory and wherein the first processor mode is a first privilege level, the second processor mode is a second privilege level, and privilege levels are associated with each segment of memory such that in order for the processor to gain access to a segment of memory, the processor must be executing in a processor mode having a privilege level that is equal or greater than the privilege level of the memory segment and wherein the instructions for performing the step of storing information store information to be used by the interrupt handler when run in the first privilege level and store information to be used by the interrupt handler when run in the second privilege level.

15. The computer-readable storage medium of claim 4, further holding instructions for:

storing a control procedure for the first processor mode in the storage;

storing a control procedure for the second processor mode in the storage;

calling the control procedure of the first processor mode when the current processor mode is the first processor mode; and calling the control procedure of the second processor mode when the current processor mode is the second processor mode.

16. In a data processing system having a processor for executing instructions and operating at different privilege levels, a storage for storing information and an interrupt handler for handling a type of interrupt, a computer-readable storage medium holding instructions for performing a method of handling interrupts comprising the steps of:

a) storing an indicator of a current privilege level of executing instructions in the storage;

b) storing information to be used by the interrupt handler when run in a first privilege level in the storage and storing information to be used by the interrupt handler when run in a second privilege level in the storage;

c) receiving an interrupt of the type handled by the interrupt handler;

d) in response to receiving the interrupt, determining the current privilege level by examining the indicator in storage;

e) running the interrupt handler using the stored information for the first privilege level in response to determining that the current privilege level is the first privilege level to avoid switching privilege levels; and f) running the interrupt handler using the stored information for the second privilege level in response to determining that the current privilege level is the second privilege level to avoid switching privilege levels.

17. In a data processing system that has a processor that runs in processor modes of real mode or protected mode and a storage for storing an interrupt handler for handling interrupts, a computer-readable storage medium holding instructions for performing a method comprising the steps of:

running the processor in the protected mode;

providing a data block along with the interrupt handler in the storage, said data blocks holding an offset value;

receiving an interrupt while the processor is running in the protected mode;

providing a data pointer to the data block for use by the interrupt handler;

with the interrupt handler, using the data pointer to locate the data block and examining the offset value in the data block; and using data at an offset specified by the offset value to run the interrupt handler in the protected mode without switching to the real mode.

18. In a data processing system having a processor that runs programs at different privilege levels and a storage for storing an interrupt handler for handling interrupts, a computer-readable storage medium holding instructions for performing a method comprising the steps of:

running a program on the processor at a first of the privilege levels;

providing a data block along with the interrupt handler in the storage, said data block holding an offset value;

receiving an interrupt while the program is run on the processor at a first of the privilege levels;

providing a data pointer to the data block for use by the interrupt handler;

with the interrupt handler, using the data pointer to locate the data block and examining the offset value in the data block; and using data at an offset specified by the offset value to run the interrupt handler at the first of the privilege levels.

* * * * *

UNITED STATES PATENT AND TRADEMARK OFFICE
CERTIFICATE OF CORRECTION

| | |
|---|---|
| PATENT NO. : | 5,694,606 |
| DATED : | December 2, 1997 |
| INVENTOR(S) : | R.A. Pletcher et al. |

Page 1 of 2

It is certified that error appears in the above-identified patent and that said Letters Patent is hereby corrected as shown below:

| COLUMN | LINE | |
|---|---|---|
| 1 | 8 | after "1995" insert --,-- |
| 1 | 45 | "a addressing" should read --an addressing-- |
| 1 | 51 | "'286protected" should read --'286 protected-- |
| 2 | 2 | after "80386" insert --microprocessor-- |
| 2 | 21 | "a entry" should read --an entry-- |
| 4 | 15 | "codes specifies" should read --code specifies-- |
| 9 | 43 | after "points" insert --to-- |
| 10 | 30 | "claim invention" should read --claimed invention-- |
| 11 (Claim 4, | 40 line 14) | after "handler" delete "responds" |

UNITED STATES PATENT AND TRADEMARK OFFICE
CERTIFICATE OF CORRECTION

PATENT NO. : 5,694,606

DATED : December 2, 1997

INVENTOR(S) : R.A. Pletcher et al.

It is certified that error appears in the above-identified patent and that said Letters Patent is hereby corrected as shown below:

COLUMN     LINE

13     31     "handier" should read --handler--
(Claim 16, line 22)

Signed and Sealed this

Twenty-eighth Day of March, 2000

Attest:

Q. TODD DICKINSON

*Attesting Officer*     *Commissioner of Patents and Trademarks*